Patented Jan. 26, 1943

2,309,580

UNITED STATES PATENT OFFICE 2,309,580

PRINTING INK

Donald Robert Erickson and Paul J. Thoma, Kalamazoo, Mich., assignors to Michigan Research Laboratories, Inc., Kalamazoo, Mich.

No Drawing. Application June 2, 1941, Serial No. 396,295

2 Claims. (Cl. 106—30)

This invention relates to improvements in printing ink.

This invention relates to printing ink and particularly to printing inks in which a binder, which is insoluble in water, is dissolved in a solvent which is miscible with water, the binder being soluble in the solvent and a limited quantity of water and not soluble in the solvent with an unlimited quantity of water. Such inks are desirable because they will stay open on the press, even when high humidities are encountered. They are also useful because offset can be prevented by treating them with water in the form, for instance, of steam or of a fine spray, so that more than a limited quantity of water is added to the solvent, thereby separating the binder from the solvent.

The objects of this invention are:

First, to provide a new and improved ink of the type described.

Second, to provide such an ink which may be made most inexpensively.

Third, to provide such an ink in which a rosin, either wood or gum, is employed as one of the main ingredients of the ink, thus reducing the cost very materially.

Other objects and advantages pertaining to details will appear from the description to follow.

We have found that either wood or gum rosin may be used to a large extent as a binder in the type of ink above described in which a liquid polyglycol such as diethylene glycol is used as the solvent and that the ink will have a high water tolerance in that the binder will not separate from the solvent when high humidity conditions are encountered, if, with the rosin we use about an equal amount of resin comprising a rosin modified with an alpha beta unsaturated organic polybasic acid such as maleic or fumaric or a resin comprising a terpene hydrocarbon of the formula $C_{10}H_{16}$ such as alpha terpinene, beta terpinene, pinene, alpha pinene, beta pinene, dipentene, limonene, or terpinolene, modified with such an acid.

The rosin itself is not soluble in non-anhydrous diethylene glycol or other liquid polyglycols but when with the rosin the above mentioned resins, either separately or combined, are used, the rosin goes into solution and is not precipitated by high humidity conditions encountered in a press room.

Typical examples of varnishes to be used with the desired amount of pigment, depending upon color and intensity desired are as follows:

1. Varnish made of 50 parts by weight of diethylene glycol, 25 parts by weight of a resin comprising a rosin modified by alpha beta unsaturated organic polybasic acid such as maleic or fumaric, and 25 parts by weight of wood rosin.

2. Varnish made of 50 parts by weight of diethylene glycol, 25 parts by weight of a resin comprising a rosin modified by alpha beta unsaturated organic polybasic acid such as maleic or fumaric, and 25 parts by weight of gum rosin.

3. Varnish made of 50 parts by weight of diethylene glycol, 25 parts by weight of a resin comprising a terpene hydrocarbon of the formula $C_{10}H_{16}$ modified by alpha beta unsaturated organic polybasic acid such as maleic or fumaric, and 25 parts by weight of wood rosin.

4. Varnish made of 50 parts by weight of diethylene glycol, 25 parts by weight of a resin comprising a terpene hydrocarbon of the formula $C_{10}H_{16}$ modified by alpha beta unsaturated organic polybasic acid such as maleic or fumaric, and 25 parts by weight of gum rosin.

We have found that the product sold under the trade name "Teglac 127" is a suitable resin comprising a rosin modified by an alpha beta unsaturated organic polybasic acid.

We have found that the product sold under the trade name "Petrex Acid" is a suitable terpene hydrocarbon of the formula $C_{10}H_{16}$ modified by an alpha beta unsaturated organic polybasic acid.

The resins may be used in a mixture and the rosins may likewise be mixed and satisfactory results are obtained.

The terms and expressions which have been herein employed are used as terms of description and not of limitation. There is no intention in the use of such terms and expressions of excluding any equivalents of the features shown and described or portions thereof. It is recognized that various modifications are possible within the scope of the invention claimed.

Having thus described our invention, what we claim as new and desire to secure by Letters Patent is:

1. A non-offsetting printing ink comprising a varnish comprising 50% by weight of a liquid polyglycol as a solvent for the binder, and a binder comprising 25% by weight of the varnish of rosin selected from the group consisting of wood rosin and gum rosin, and 25% by weight of the varnish of a resin selected from the group consisting of a resin comprising a rosin modified by an alpha beta unsaturated organic polybasic acid and a resin comprising a terpene hydrocarbon of the formula $C_{10}H_{16}$ modified by an alpha beta unsaturated organic polybasic acid, said binder being soluble in said polyglycol and in a mixture of said polyglycol and a limited quantity of water but insoluble in a mixture of said polyglycol and an unlimited quantity of water, and a pigment.

2. A non-offsetting printing ink comprising a varnish comprising a liquid polyglycol as a solvent for the binder and a binder comprising rosin selected from the group consisting of wood rosin and gum rosin and a resin selected from the group consisting of a resin comprising a rosin modified by an alpha beta unsaturated organic polybasic acid and a resin comprising a terpene hydrocarbon of the formula $C_{10}H_{16}$ modified by an alpha beta unsaturated organic polybasic acid and in sufficient amount to form when subjected to steam immediately after printing a thin hard film of said binder over the exposed surfaces of the printed film, said binder being soluble in said polyglycol and in a mixture of said polyglycol and a limited quantity of water but insoluble in a mixture of said polyglycol and an unlimited quantity of water, and a pigment.

DONALD ROBERT ERICKSON.
PAUL J. THOMA.